United States Patent
Weichel

[15] 3,669,192
[45] June 13, 1972

[54] APPARATUS FOR HARVESTING CEREAL GRAINS, LEAFY VEGETABLES OR HOED VEGETABLES

[72] Inventor: Ernst Weichel, Bohnhofstrasse 1, Heiningen, Kreis Goppingen, Germany

[22] Filed: Feb. 16, 1970

[21] Appl. No.: 11,378

Related U.S. Application Data

[62] Division of Ser. No. 560,972, June 23, 1966, Pat. No. 3,521,439.

[52] U.S. Cl. ................................................................171/40
[51] Int. Cl. .........................................................A01d 27/00
[58] Field of Search ................171/40, 26, 42, 47; 56/364, 56/341, 192

[56] References Cited

UNITED STATES PATENTS

| | | |
|---|---|---|
| 3,106,814 | 10/1963 | Roy .........................................56/341 |
| 2,376,950 | 5/1945 | Wilkins....................................171/42 |
| 2,665,533 | 1/1954 | Bozeman et al. ........................171/40 |

*Primary Examiner*—Antonio F. Guida
*Attorney*—McGlew and Toren

[57] ABSTRACT

A unit for harvesting hoed, leafy and stalk crops includes a frame and a draw bar extending from the frame for towing of the unit along a path laterally adjacent and parallel to the travel of a tractor, with the harvesting unit extending rearwardly and laterally of the tractor. A crop carrier may be drawn by the tractor and the harvesting unit may be drawn by the crop carrier. The harvesting unit includes a guide scoop and associated power driven means for moving harvested material along the guide scoop and into the crop carrier. Various known harvesting devices may be interchangeably mounted to extend along the forward edge of the scoop and substantially perpendicular to the path of travel.

19 Claims, 12 Drawing Figures

INVENTOR
Ernst WEICHEL his ATTORNEYS

INVENTOR
ERNST WEICHEL

INVENTOR
ERNST WEICHEL

APPARATUS FOR HARVESTING CEREAL GRAINS, LEAFY VEGETABLES OR HOED VEGETABLES

REFERENCE TO RELATED APPLICATION

This application is a division of co-pending application Ser. No. 560,972, filed June 23, 1966, now U.S. Pat. No. 3,521,439, issued July 21, 1970, for "APPARATUS FOR HARVESTING CEREAL GRAINS, LEAFY VEGETABLES, OR HOED VEGETABLES."

BACKGROUND OF THE INVENTION

A disadvantage of known self-loading crop carriers and their method of operation resides in the fact that, as a rule, they are drawn directly behind a tractor in such a manner that the wheel tracks of the crop carriers correspond with the wheel tracks of the tractors. Consequently, the material to be picked up must be deposited, generally prior to loading, in the form of swaths which will lie between the wheels of the tractor. Additionally, with known designs of crop carriers, simultaneous mowing and loading of a swath is not possible. While it is true that one swath can be mown with a mowing unit extending laterally from the tractor and, during mowing of this one swath, a previously mown swath is simultaneously traversed by the tractor, this has the disadvantage that, prior to the loading of the first swath in a crop carrier, a tractor has to make a run in which a swath is mown but no swath is loaded. Also, before completion of the harvesting of the field, another run must be made in which only loading takes place and no mowing. This leads to a large number of wheel trails in the field, and this is a great disadvantage, particularly in bad weather or on moist or damp soil, to the extent that it is not feasible to use a labor-saving, self-loading crop carrier.

Various expedients have been proposed to avoid these disadvantages, but they have generally been subject to other and sometimes greater disadvantages. For example, it has been proposed to use a mowing unit in front of the tractor, but this entails the disadvantage that, for towing the mowing unit, its connection must be transferred from the front of the tractor to the rear of the tractor, in addition to which there are operating disadvantages. It has also been proposed to design a self-loading crop carrier as an automatically driven vehicle, but this has entailed an unduly great expense.

A further proposal has been to connect the self-loading crop carrier laterally with the tractor so that it can pick up a freshly mown crop while the tractor is mowing a new swath, or else can pick up a swath mown by a mowing unit extending laterally from the tractor and immediately after the mowing. However, this has the disadvantage that the lateral traction of the crop carrier, including its own weight and its useful load, is double and triple the load of the tractor itself, which requires a more expensive design of tractor and a greater degree of driving skill. In addition, there is an increased accident risk when such an arrangement is used over unfavorable terrain, coupled with the further disadvantage that the crop must be deposited, at least temporarily, on the ground before it can be picked up by the self-loading crop carrier.

Other disadvantages of known self-loading crop carriers reside in limitations as to the type of crop with which they may be used, as well as the disadvantage that they are not suitable for swathing, turning, or lateral pickup of the crop.

From the foregoing, it will be readily appreciated that there is a long felt need for a harvesting method and apparatus of greater versatility with respect to the type of crop which may be harvested and which would be more or less universally adaptable to all types of crops, thereby obviating the necessity of purchasing expensive and poorly utilized special machinery. Such a unit, in addition, should be usable with known, commercially available self-loading crop carriers.

SUMMARY OF THE INVENTION

This invention relates to harvesting apparatus and, more particularly, to a novel and improved tractor-drawn harvesting apparatus including a harvesting unit towed by a tractor, or by a crop carrier drawn by a tractor, along a path laterally adjacent and parallel to the path of travel of the tractor.

The harvesting unit includes a frame having a draw bar extending therefrom for towing of the unit, and the harvesting unit extends rearwardly and laterally from the tractor. The frame includes a first frame member extending parallel to the path of travel of the unit on the side of the frame adjacent to the path of travel of the tractor, and includes a second frame member extending laterally and forwardly from the rear end of the first frame member. The frame members support means providing a crop guiding surface including a bottom wall occupying at least the area defined by the frame members and having a forward crop pick-up edge extending transversely of the direction of travel of the unit. This means also has a rear, upwardly extending wall extending longitudinally of the second frame member, and a crop discharge edge extending adjacent and parallel to the first frame member. Crop conveying means are mounted on the frame and have a conveying direction extending substantially parallel to the length of the second frame member and toward the first frame member, this crop conveying means transferring harvested crop, entering the guiding surface over the forward edge, laterally and rearwardly of the guiding surface to the crop discharge edge. Driving means are mounted on the first frame member, and crop distributing means are mounted on the frame and are operative along the crop discharge edge of the guiding surface. Power transmission means connect the crop distributing means to the driving means, and are operable to drive the crop distributing means at a speed such as to distribute the crop from the guiding surface laterally over substantially the full width of the path of travel of the tractor, for spreading of the harvested crop.

The harvesting unit may be used to pick up crops which have been previously cut by means carried either by the tractor or by the crop carrier. In addition, the harvesting unit is very versatile as various harvesting means may be mounted to extend along the forward edge of the crop guiding surface. For example, the devices may include means for picking up leafy vegetables or stalks, or may include means for picking up root vegetables.

Accordingly, an object of the invention is to provide a harvesting unit arranged for either lateral or frontal attachment to known self-loading crop carriers and which can be quickly attached and detached.

A further object of the invention is to provide a harvesting unit which is operable on the crop either beside a tractor or in front of a crop carrier drawn by the tractor and which harvests the crop either by mowing, cutting, rooting out, or picking up.

Yet another object of the invention is to provide such a harvesting unit which delivers the harvested crop to guide means extending adjacent mowing, cutting, gripping, or derooting units, and which terminates behind the tractor and within the area of operation of gripping and conveying devices of a crop carrier drawn by the tractor.

A further object of the invention is to provide a harvesting unit of the type just mentioned in which the crop is conveyed by conveying elements along a path extending obliquely rearwardly relative to the area of the receiving means of the crop carrier at the end of the guide means.

Yet another object of the invention is to provide a harvesting unit of the type mentioned which is so formed that it may quickly and easily be attached to and detached from a swingable arm adjustable to a fixed position and adjustable as to height above the ground, although positioned near the ground, thereby providing versatility as to the harvesting path.

Still another object of the invention is to provide an apparatus for harvesting crops, such as sugar beets, in which a row of sugar beet leaves and a row of sugar beets may be simultaneously harvested or alternately harvested.

A further object of the invention is to provide an apparatus for harvesting crops by means of which dug crops may be temporarily deposited on the ground for drying of soil attached thereto, or alternatively may be cleaned before depositing in a crop carrier drawn by a tractor.

Still a further object of the invention is to provide a harvesting apparatus of the type mentioned which is further useful for harvesting hay and fodder for storage, for example by loosening, turning, swathing, or strewing.

A further object of the invention is to provide a harvesting apparatus for cereal grains, leafy vegetables or hoed vegetables which is simple in design, economical in construction and operation, and efficient in use.

For an understanding of the principles of the invention, reference is made to the following description of typical embodiments thereof as illustrated in the accompanying drawings.

DESCRIPTION OF THE PREFERRED EMBODIMENTS

Figure 1:
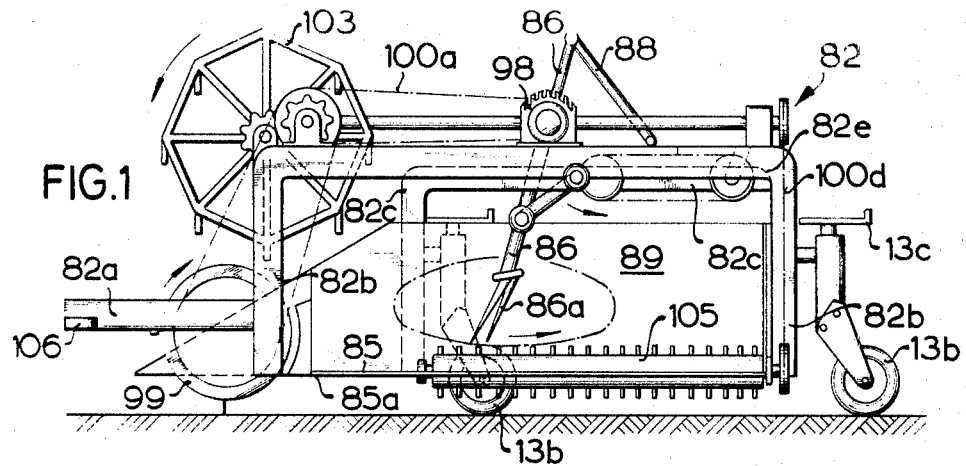
FIG. 1 is a side elevation view of one form of harvesting unit embodying the invention, as viewed from the left in the direction of travel.
Figure 2:
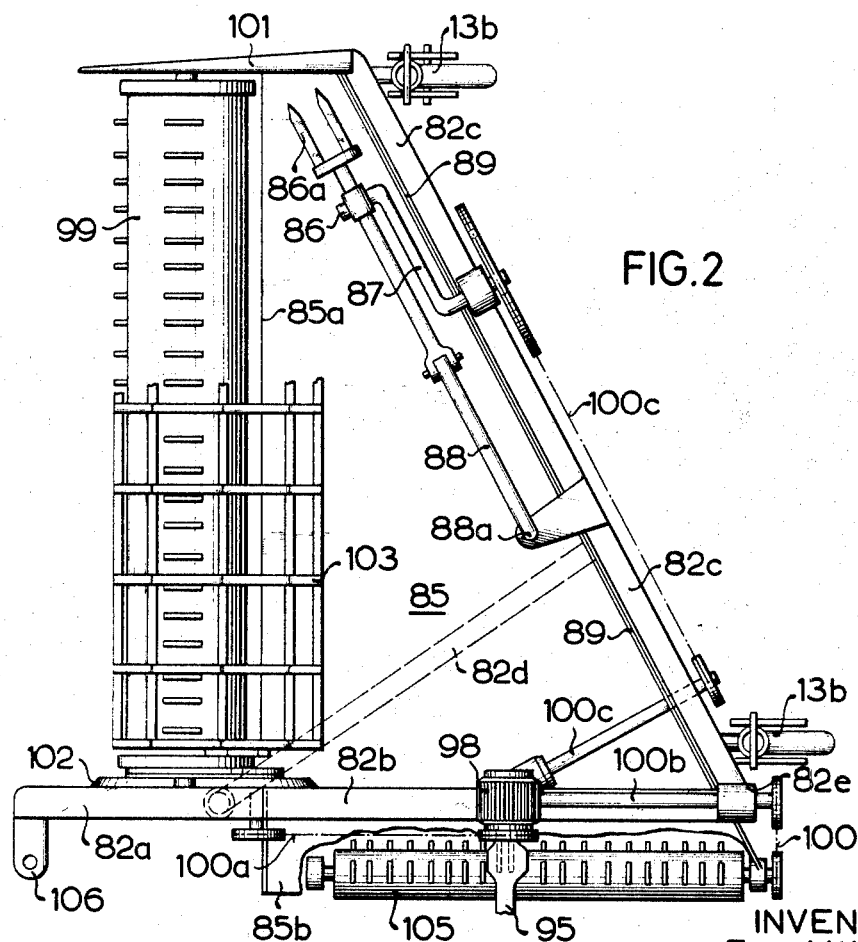
FIG. 2 is a plan view of the unit shown in FIG. 1.

Referring first to FIGS. 1 and 2, and as can be best seen from FIG. 2, a harvesting unit 82 embodying the invention is illustrated as comprising a tubular frame having a front part 82a designed as a rigid traction member or draw bar having a preferably laterally extending traction eye 106. Draw bar 82a extends forwardly from an inverted U-shaped frame 82b on which there is mounted a reduction gear unit 98 from which there extend power transmission means 100a, 100b, 100c and 100d. Unit 82 further includes a member 82c extending laterally and forwardly at preferably an acute angle to the member 82b, and terminating in a forwardly extending triangular wedge-shaped terminal plate 101. A pair of support wheels 13b are provided, one mounted at each end of the frame member 82c, and means 13c are provided for adjusting the height of the unit 82 relative to the support wheels 13b. Frame members 82b and 82c are interconnected at point 82e, and by a guiding means or plate 85 and a strut 82d extending beneath the plate 85, terminal plate 101, in conjunction with frame member 82b, serves to mount various receiving devices for operational units. By way of example, these two elements may mount a conveying windlass 103, and a receiving or pick-up drum 99, a blade-type mowing beam 84 (FIG. 5), clearing means 45 (FIG. 8), and cutting devices 44 (FIG. 6), etc. The frame member and the terminal plate may also be used to mount known cereal distribution devices and/or sliding skids adjustable relative to the surface of the ground. For the purpose of supporting these parts, the frame member 82b has mounted plates 102 which, together with terminal plate 101, interchangeably receive the various work units.

The forward edge 85a of guide plate 85 is adjacent pick-up drum 99, mowing beam 84, or other working units in such a manner that it is at only a short distance above the ground, as is the entire guide path or guide plate 85, so that all types of crops can easily fall over forward edge 85a into guide plate 85. The inner lateral edge 85b of guide plate 85 extends preferably substantially parallel to the direction of travel, and also extends at a level somewhat higher than that of the main portion of the guide means. An edge wll 89 extends along the back part of the guide plate 85, and is preferably arranged to extend a substantial distance upwardly by bending from the guide plate 85 and fastening to the frame member 82. This edge wall 89 prevents the crop from falling over the rear edge of the guide means.

Within guide plate 85 there are provided conveying elements 86 which are designed, in the embodiment of the invention shown in FIGS. 1 and 2, as grippers or forks 86a, connected to guide rods 88, articulated to frame member 82c in such a manner that these grippers operate in a somewhat elliptical or oval path, as indicated by the dot and dash line in FIG. 1. These conveying elements convey the crop, entering guide plate 85 over forward edge 85a, without the crop coming into contact with the ground, and generally in the direction of the extent of rear wall 89, laterally towards edge 85b. The conveying is effected in such a manner that the lateral removal of the crop occurs along edge or wall 89 so that access of the crop over the entire width of harvesting unit 82, with the crop entering over forward edge 85a, is not impeded.

Figure 4:
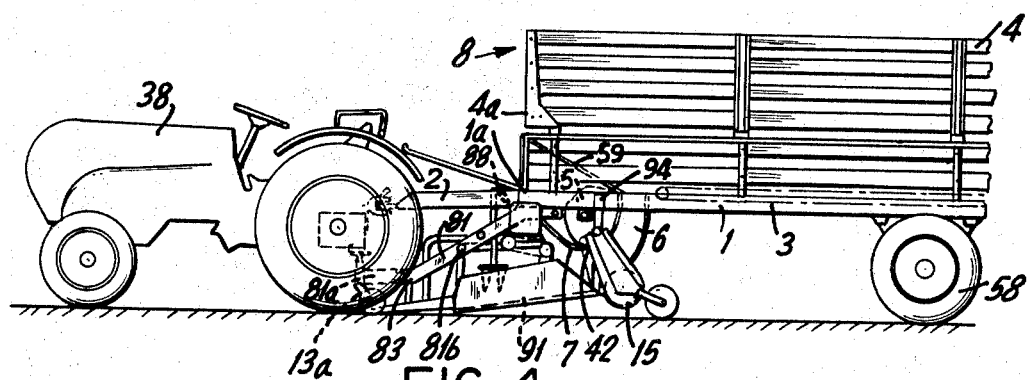
FIG. 4 is a view similar to FIG. 3 but looking from the left in the direction of travel.
Figure 5:
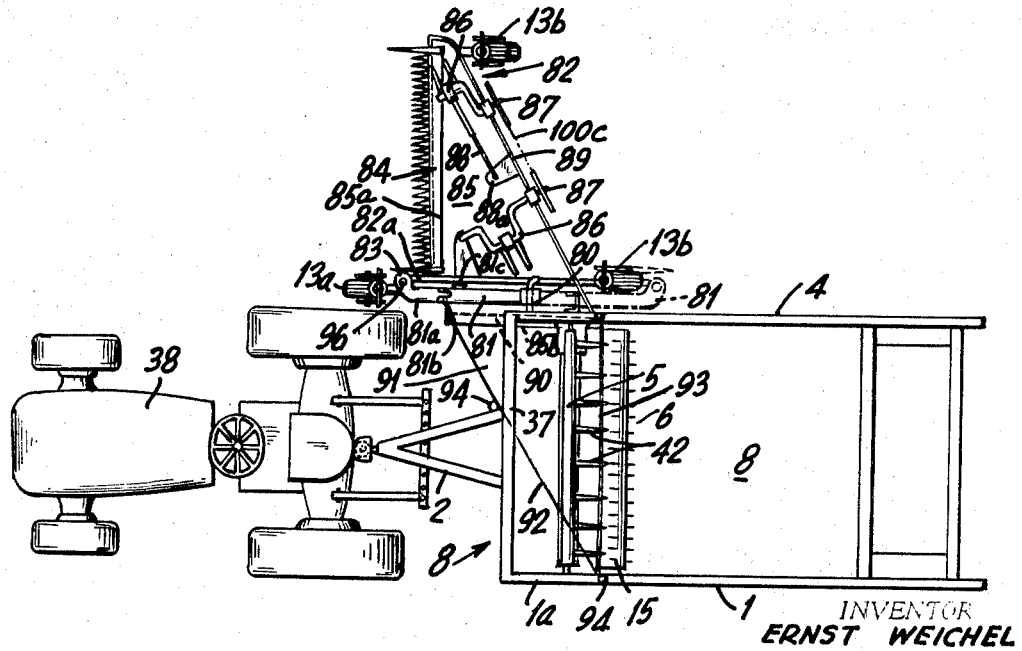
FIG. 5 is a plan view of the unit shown in FIG. 4.

In accordance with the invention, a transport or throwing roller 105 can be provided on unit 82 and, depending upon its angular velocity, conveys the crop from edge 85b by a thrust motion to a further guide means or tub 91 (FIGS. 4 and 5). Alternatively, roller 105 can be arranged to spill the crop, for example during spreading of the crop, onto the ground. These units 105 are known per se.

Driving of the work units, such as mowing beam 84, receiving drum 99, conveying windlass 103, and conveying elements 86 or cutting devices 44 (FIG. 6), as well as other working units, is effected through the reduction gear 98 with the mentioned power transmission elements 100a, 100b and 100c, of a known type and in a known manner, with driving of roller 105 being effected by power transmission element 100d. Other known power transmission means, such as hydraulic or pneumatic means, can also be used for transmitting the driving forces.

Figure 3:
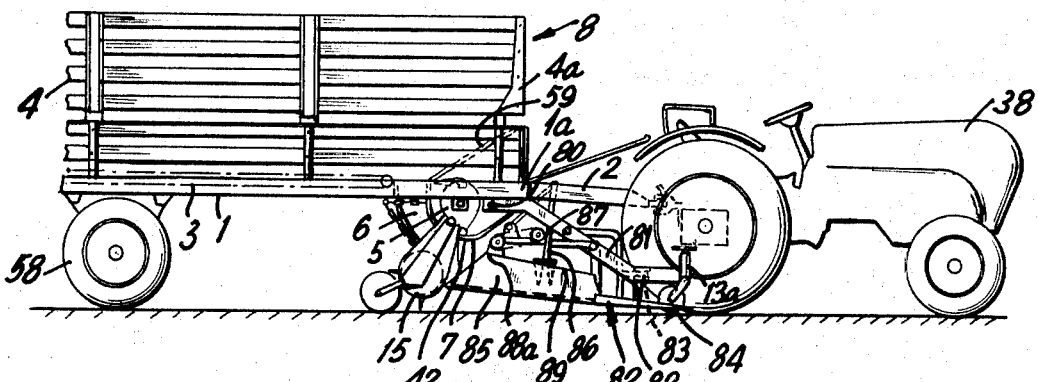
FIG. 3 is an elevation view, looking from the right in the direction of travel, of a combination unit including a tractor, self-loading crop carrier drawn by the tractor, and a harvesting unit drawn by the tractor.

FIGS. 3, 4 and 5 show the arrangement of a harvesting unit, similar to that shown in FIGS. 1 and 2, but without the windlass 103, drum 99, and roller 105, in operative position together with a crop carrier 8 and a tractor 38. Crop carrier 8 is of a type known per se, and is provided with a draw bar 2, a cross beam 37, a frame 1, a frame extension 1a, a scraping means 3, a loading space 4, a preferably removable receiving drum 15, and a preferably removable conveying device 5 having conveying prongs 42 which engage in a conveying channel 6, preferably through a removable grating 7. Channel 6 ends at the edge of the loading space, either at the height of the loading area or somewhat thereabove. Grating 7, which represents the front wall of conveying channel 6, may terminate at a front wall 59 of the loading area, which is illustrated in dotted lines in FIGS. 3 and 4. This wall 59 can be arranged as a fixed limiting wall or as a swingable wall, so-called "swing plank," which is adjustably latchable in several positions. In the latter case, wall 59 can b e swung forwardly, as shown in FIGS. 3 and 4, to enlarge the loading space and to cover the area above device 5 during the loading of certain crops, such as light items, until the load is adjacent the front wall 4a of loading area 4.

Crop carrier 8 is provided with a discharge opening (not shown) preferably at its rear end, and can be designed as a single axle vehicle with two support wheels 58, or as a multi-axle vehicle. However, the single-axle design is generally used because of the advantage of the support of a part of the weight of the crop carrier on the rear axle of the tractor, because of the feasibility of reverse movement of the crop carrier, and because such a design is less expensive. The tractor and the crop carrier, insofar as their general construction is concerned, are known per se.

In accordance with the invention, a bearing 80 is arranged on one side of the crop carrier, preferably at that side to which a mowing unit is attached to tractor 38. Bearing 80 is on frame 1 and is designed in such a manner that it can be attached to the frame. An arm 81 is swingably supported in bearing 80 and is preferably adjustably latched in two positions in such a manner that its free end extends, in its operational position, along the frame 1 of the crop carrier beyond cross beam 37.

However, in the idle travel condition of crop carrier 8, and when arm 81 is not being used, it is swung backward in a vertical plane and latched in a fixed position to frame 1, thus saving space, as shown in dotted lines in FIG. 5. The free end of arm 81 carries a support wheel 13a which is adjustable as to height and guides arm 81. The adjustment provided by support wheel 13a is of wuch a nature that suspension eye 83, at the free end of arm 81a, extends laterally outwardly and, while being fixable in position, is movable in a vertical plane.

The harvesting unit 82 is attached to suspension eye 83 by means of a known pin connection in such a manner that it is supported, through draw bar 82a of unit 82, by suspension eye 83. The unit 82 is supported on the ground by the trailing, freely turnable wheels 13b. Lateral swinging movements of the unit 82 are limited by buffer 81c on arm 81, at least to such an extent that, during travel around curves, lowering of crop carrier 8 by the unit 82, or a collision with receiving drum 15 or conveying device 5, are avoided.

In further accordance with the invention, the forward portion 81a of arm 81 can be designed as an extensible construction to counterbalance different lengths or depths of the work units such as, for example, a cutting device, a clearing device, a receiving drum or the like. Such extension can be of a telescopic nature so that all these work units can be arranged at any time at the right distance in front of the forward edge 85a of guide plate 85 and in such a manner that the harvested crop is delivered to guide plate 85 without any subsequent contact with the soil and directly from the stock. In the area of rear edge 89 of guide plate 85, the conveying elements 86 can be arranged in as large a number of units as necessary and in such a manner that they clear the bottom surface of guide plate 85. They transport the crop substantially parallel to rear edge 89 of guide plate 85 in a direction toward the crop carrier or toward the receiving device on the crop carrier.

However, the forks 86, illustrated in FIG. 1 through 5, have the advantage of simple design and periodic motion, as well as being suitable for transferring large volumes of crops having long stalks, such as grain or corn, etc. In addition, inasmuch as these conveying elements 86 are arranged entirely above guide plate 85, it is possible to set guide plate 85 at a very low level or very near the ground. In accordance with the invention, guide plate 85 can be adjusted to the path of motion of the conveying means and thus be oriented in an upwardly sloping manner from the forward edge 85a to the lateral edge 85b. The periodic manner of operation of conveying elements 86 has the advantage that the speeds of these elements can be correlated with those of conveying device 5, or selected in such a manner that the conveying stroke of elements 86 starts, for example, always when the prongs 42 of drum 5 have passed the inlet of channel 6 or drum 15, and so that the conveying stroke is completed, at the latest, when prongs 42 emerge downwardly into the area underneath cross beam 37 in order to contact another portion of fodder to introduce the same into channel 6. Thereby, a smooth delivery of the crop from conveying elements 86 to conveying device 5 of the crop carrier 8 is effected, so that high performance is possible while the conveyed crop is nevertheless treated carefully.

Conveying elements 86 also may have a variable speed at the end of their conveying stroke, for example by resetting the radius of crank 87 or the length of throw of guide rod 88, so that, within a certain area, a variation of the thrust or throwing range of elements 86 is possible, whereby the crop can be transported over different distances. For example, the crop can be thrown in front of the center of the crop carrier or across the center thereof. Thereby, the tractor driver can insure a uniform loading of the crop carrier on both sides of the loading area without the necessity of using an additional roller 105.

Figure 6:
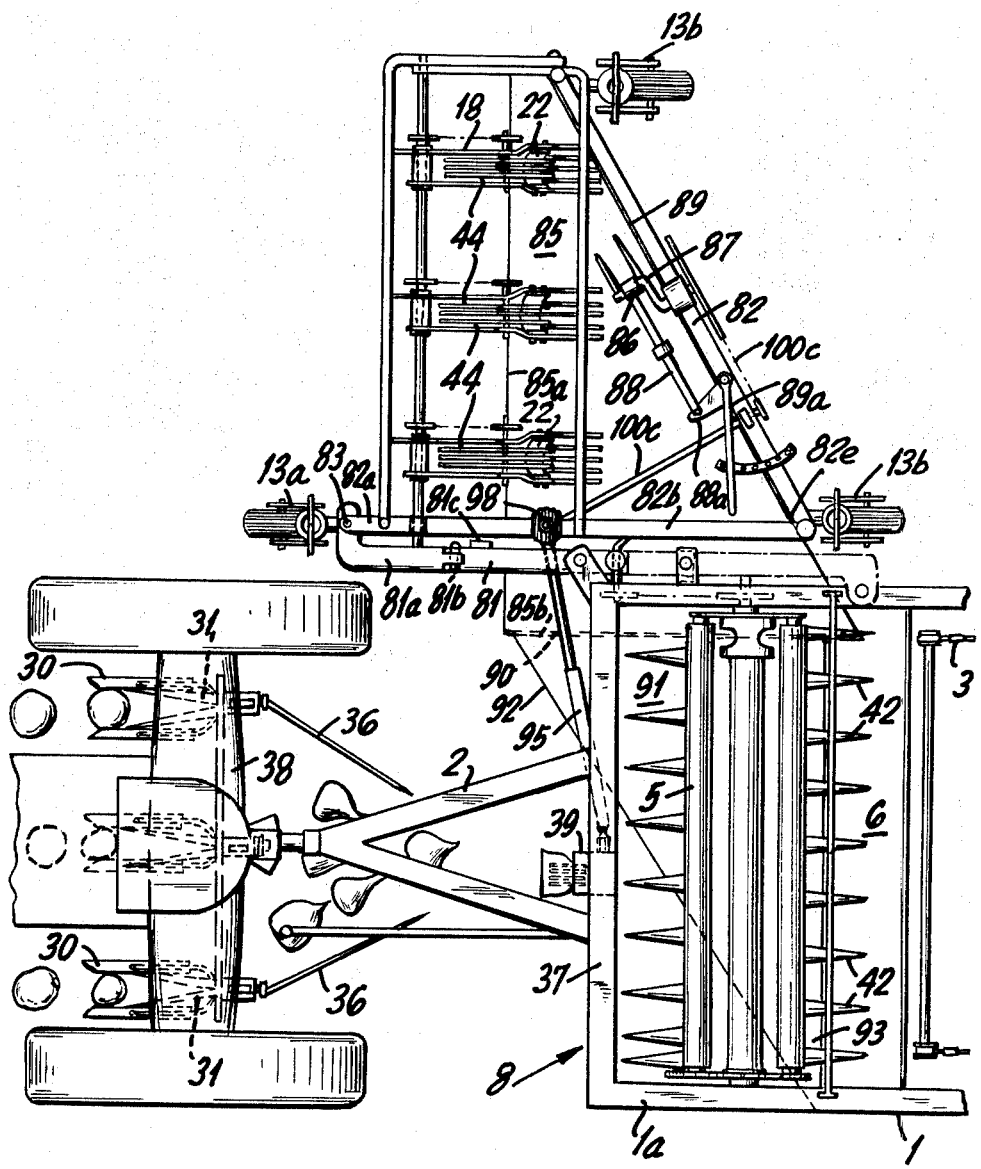
FIG. 6 is a plan view of another form of harvesting unit embodying the invention, particularly designed as a turnip head cutting device, and illustrating a turnip clearing device attached to the tractor.

A similar effect can be attained in another manner, as shown in FIG. 6, by arranging, in the area of rear edge 89 of guide plate 85, an adjustable deflector 89a which, depending upon the desired feeding of the crop, is adjustable, for example, mainly at the right side, or at the center, or at the left side of the receiving drum 15.

Particularly when harvesting crops to whose clean condition special attention is attached, for example, turnip leaves, field vegetables, etc., the lateral edge 85b of guide plate 85 is positioned above the adjacent lateral edge 90 of a guide tub 91 suspended beneath cross beam 37 of crop carrier 8. Tub 91 is adjustable as to height but is removably fastened to the crop carrier, and the forward edge thereof extends a substantial distance upwardly, as by being bent upwardly, and extends rearwardly and laterally in an oblique fashion toward the left edge of the receiving drum. The rear, smooth edge 93 of tub 91 extends in front or underneath the operating area of prongs 42 or drum 15. Tub 91 preferably is suspended by struts 94 which are adjustable as to height, or are liftable or removable in a known manner, underneath frame 1 or cross member 37 of crop carrier 8. It is sufficient if these struts are arranged at the left or at the right ends of the rear end 93 of tub 91, and at forward edge 92 in the area of the intersection of this edge with cross beam 37 or traction device 2.

As will be apparent from FIG. 5, guide means 85 in conjunction with guide tub 91 forms a crop conveying path which has a parallelogram shape in plan. The forward edge 85a of this path extends laterally from the tractor or the crop carrier along a work or receiving unit 84, and the rear edge 93 of the path extends approximately parallel to the forward edge beneath crop carrier 8 and substantially coincident with one of the conveying devices 5 or 15. The lateral edges 89 and 92 of this path are substantially elevated and connected with the respective bottom parts 85 and 91. This arrangement of the guide path makes it possible for the harvested crop to have sufficient space, across the entire receiving width, to fall onto guide plate 85 and to be conveyed laterally and rearwardly at an oblique angle.

In accordance with the invention, the provision of conveying elements in the area of rear edge 89 of the guide path is sufficient in most cases. However, known types of conveying elements could be arranged adjacent front edge 92 of guide tub 91, but they are required, at the most, only with sensitive or very heavy crops, since the conveying action of elements 86 is sufficient, due to the fact that they have a certain throw effect and a thrust action on the crop, to guide the crop to the left side operational area of receiving drum 15 or prongs 42. The parts are designed for limited relative adjustment between guide plate 85 and guide tub 91 in both the vertical and horizontal plane so that an optimal ground adjustment of unit 82 can be effected.

The driving devices for the work units, the conveying elements, or both can receive their drive either from the tractor drive shaft or from a gear unit on the frame of crop carrier 8. Alternatively, they could receive their drive by means of hydraulic power transmission elements, in a known manner. The coupling elements of the power transmission means preferably consist of easily disengageable clutches. Since the transmission means are shown more particularly in FIGS. 1 and 2, they are illustrated only partially in FIGS. 3, 4 and 5 for reasons of clarity. As one of several possible examples of driving means, FIGS. 2 and 6 show a two section shaft 95 which is extendable and retractable and is connected to a gear unit 39 on crop carrier 8 in such a manner that it can drive gear unit 98 on frame member 82b. As previously mentioned, gear unit 98 is connected to the driving means for the various work units and conveying means.

MANNER OF OPERATION

With the invention arrangement, guide tub 91 can be fastened to crop carrier 8 with a few manual operations when it is intended to pick up crop laterally or outside the traveling path of tractor 38. In this event, arm 81a is brought into operating position and adjusted to a fixed elevation, and harvesting unit 82, deposited on the field or drawn behind crop carrier 8, is supported in a swiveling manner, with a pin in eye 83 of cantilever arm 81a.

The desired operating height is set by adjusting support wheels 13a or 13b, and gear 98 is connected to gear 39 through shaft 95, or may be connected to any other power source. The tractor is then driven across the field to be harvested, and the crop is picked up laterally of the tractor or cut from the plants without being run over by the tractor wheels. The crop falls onto guide plate 85 and there accumulates until it slides into the area of operation of conveying elements 86 which push or throw the crop along rear edge 89 laterally and rearwardly to the operating area of receiving drum 15 or prongs 42. There the crop, without having touched the ground again, is gripped, conveyed through channel 6 into the loading space, stapled, distributed by means of scraping device 3, and simultaneously compacted by regulating the rate of conveying speed in the vertical and horizontal directions, if necessary, and in a known manner.

After loading, coupling pin 96 is pulled out of eye 83, and shaft 95 is disconnected so that harvesting unit 82 can be left standing on the field till the next lot is to be loaded. The crop carrier is then drawn to the crop storage location. Naturally, unit 82 could also be connected to a trailer hitch on the rear edge of crop carrier 8 and at the left-hand end thereof so that it too could be drawn along with the crop carrier. If it is so drawn, it is supported on wheels 13b which can be adjusted to a fixed position for such traction of the harvesting unit, that is, they can be adjusted to be fixedly parallel to each other. On the other hand, during the working operation of harvesting unit 82, support wheels 13b swing around vertical pivots so that they can follow all movements of the tractor and the crop carrier, for example during travel along curves. Suspension point 83 must be positioned far enough laterally or rearwardly of the right side tractor wheel that, during travel along curves, a collision between cantilever arm 81a and the tractor wheel is not possible. With the harvesting unit 82, it is possible to use crop carriers of different designs for different methods of operation for harvesting a crop.

The crop can be taken up in a known manner directly behind the tractor, for example, by picking up the crop lying on the ground in swaths. If it is desired, for example during the daily fetching of green fodder, to move the crop and load it in one operation without touching the ground, and in a clean and careful manner, then use is made of the laterally projecting harvesting unit 82. In this case, it is best to leave unit 82 standing in the field at all times.

In place of the conventional moving beam incorporated in unit 82, as shown in FIGS. 3, 4 and 5, a mowing beam could be rigidly mounted on the tractor in front of or behind the rear wheels. In the latter case, through a guide grating or sheeting arranged adjacent the blade beam 84, it can be assured that the cut crop does not drop to the ground. A special advantage of the lateral work unit 82 is, however, that it is possible to harvest across a wide path and thus obtain a high hourly performance.

Thus, the usual mowing mechanisms on tractors have an operating path width, for structural reasons, of about 1.50 to 1.80 meters, as a rule. Experience has indicated that this path width is too small to be able to cut, in one operation and with average plant stock, sufficient crop that the capacity of known crop carriers is efficiently and fully utilized. For this reason, it is necessary, during simultaneous mowing and loading with conventional tractor mowers, regardless of whether the same swath is simultaneously mowed and immediatly loaded, or whether one swath is mowed while a previously cut swath is being loaded, to put up with the disadvantage that the receiving and conveying devices of known crop carriers cannot be utilized at full capacity. Consequently, up to the time of the present invention, considerable idle travel was involved until the crop carrier was filled to its capacity. Durong mowing or picking up, an operating path width sufficiently large that the conveying capacity of known crop carriers can be fully utilized with average yields, is desirable. Thus, the crop carrier, operating on average field sections, could be loaded in a single run over the length of the property and the number of wheel tracks on the field could be kept to a minimum. This is particularly important in moist soil and in bad weather. However, with the harvesting unit 82 of the invention, an operating path width of 2.50 to 3 meters, or greater, can be provided since unit 82, operating as a trailer, is not subjected to the limitations of units directly attached to the tractor, as to its dimensions. Thus, the invention unit makes possible a considerable increase in performance with known crop carriers, and thus a considerable saving in time, labor and other expense.

FIG. 6 illustrates an arrangement wherein two or more different operations of harvesting and/or loading can be effected in a single path. As illustrated, the laterally extending harvesting unit 82 can be used for lopping several rows of turnip leaves which, immediately after being cut, are transferred to the receiving and conveying device 5 by guide plate 85 and loaded on scraping device 3 of crop carrier 8. Either simultaneously with this lopping process or, in the case of low power tractors, alternately, the previous group of turnip rows, which have already been lopped, can be harvested of the turnips. This is effected by clearing bodies 31 mounted on the tractor and provided, in a known manner, with self-guiding means such as guide skids 30. By means of deflector gratings 36, the dug out turnips are guided into a single row extending between the tractor wheels. Thus, harvesting of the turnip leaves is possible "directly from the matured condition" without wheels of the tractor or of a harvester having to pass through the rows beforehand. Additionally, the turnips can be harvested directly after the relatively narrow, and lightly loaded, front wheels of the tractor have traveled through the rows. The relatively wide rear wheels, which are heavily loaded, of the tractor and the crop carrier, press down the ground only after the total crop has been harvested in its optimal condition. The result is a lower amount of soil on the crop and a considerable improvement in quality.

The traction performance of unit 82 carrying the lopping device is better with crop carriers drawn by the tractor, as these put an additional load on the tractor rear wheels as compared with an arrangement in which only the lateral lopping device itself is drawn by a tractor without a crop carrier being suspended at the rear of the tractor. Clearance means 30 and 31 on tractor 38 automatically adjust their level to the turnip rows. The lopping or cutting devices 44 can be designed in different manners from that shown somewhat schematically in FIG. 6, and with a sufficiently large width of the feeling disks 18 and lopping knives 22 so that, even with small steering errors or deviations in the rows, a smooth lopping of turnips is possible, this being effected in a known manner. Since the leaf is separated from the turnips and picked up from the field immediately after the lopping, the harvesting of beets or turnips is possible by means of the so called flow method.

Each row group can be lopped and cleared practically simultaneously. Thus, it is no longer necessary that large sections of the field be lopped and remain unharvested for too long a period of time before clearance. In such an event, serious losses of plant sugar would arise. Thus, through daily harvesting of only a few rows, the crop will be distributed over a longer period at random if, for example, the turnip leaf is to be used as fodder in fresh condition at all times. This set of conditions should be compared with present conditions in which, even using expensive special machinery requiring more than one person to operate, at least a part of the crop, such as beets or leaves, had to be temporarily deposited on the ground even though the special machines are provided with storage hoppers in which the crop is temporarily collected. Thus, the method and apparatus of the present invention provides for a greatly increased efficiency of harvesting operation.

Figure 7:
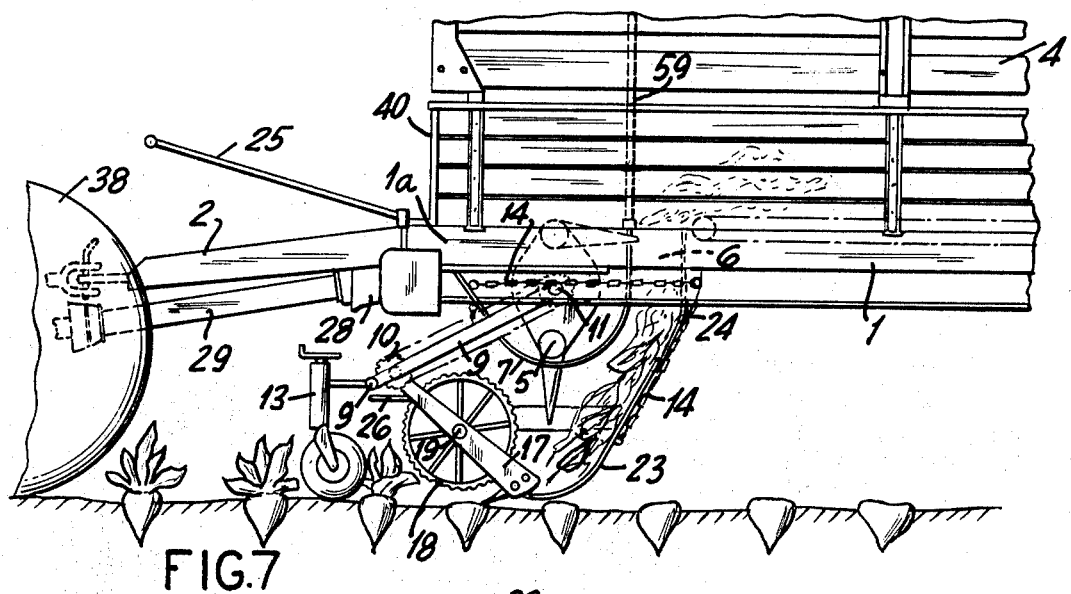
FIG. 7 is a side elevation view.
Figure 8:
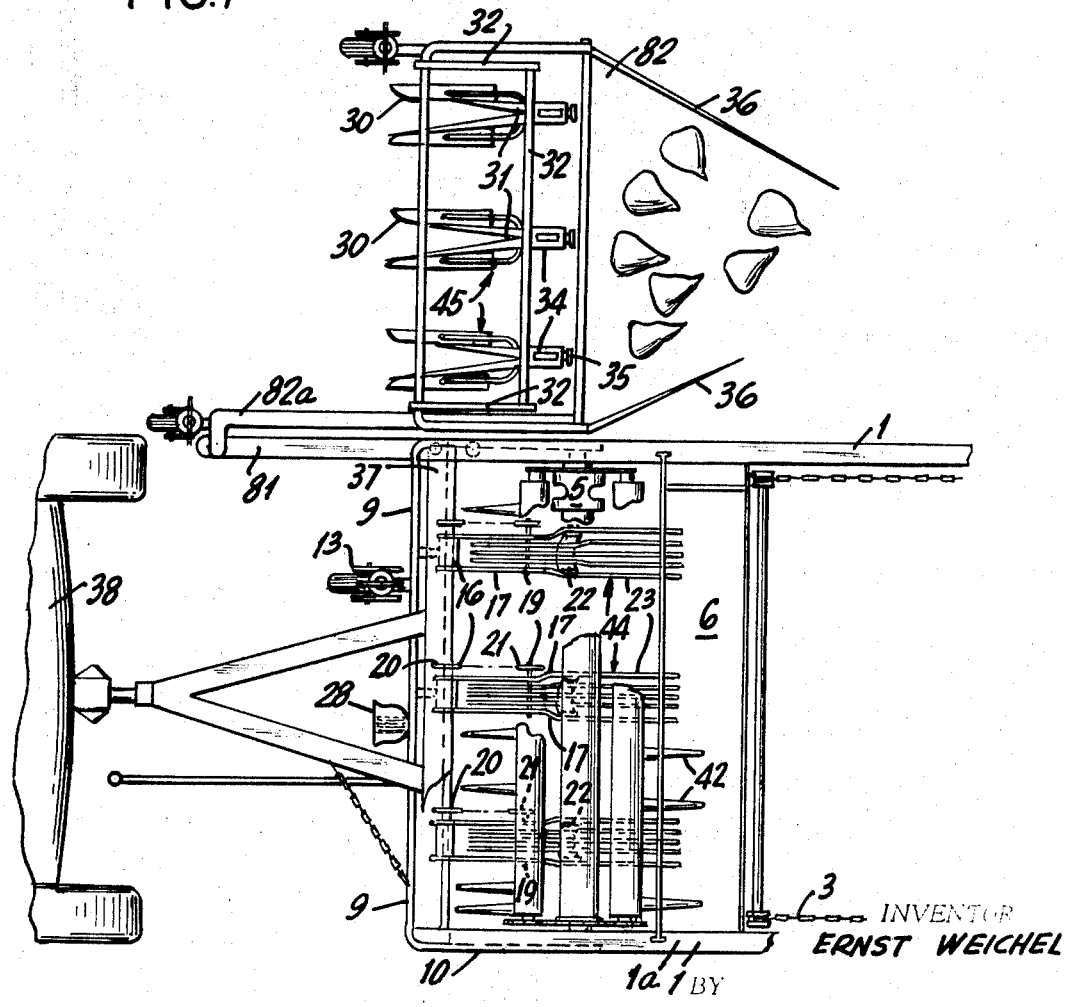
FIG. 8 is a plan view illustrating another embodiment of the invention in which a root crop clearing device is incorporated in the harvesting device and cutting means is incorporated in the crop carrier.

FIGS. 7 and 8 illustrate an embodiment of the invention modified somewhat from the embodiment illustrated in FIG. 6. In FIGS. 7 and 8, the lopping or cutting devices 44 are mounted beneath the crop carrier, and the root vegetable clearing or digging devices 45 are mounted in the lateral harvesting unit 82. As distinguished from the manner of operation of FIG. 6, the equipment combination of FIGS. 7 and 8, is driven around the field in a counterclockwise direction. The arrangement of FIGS. 7 and 8 is particularly useful where it is customary to drill the beets over larger row widths, or where very productive or siftable soils and tractors having narrow tires, are available, these permitting a passing of the tractor through the beet stock prior to lopping. Furthermore, with the manner of operation of the equipment shown in FIGS. 7 and 8, the clearing of beets is possible without having to re-cross the field a second time. The arrangement shown in FIGS. 7 and 8 is particularly applicable when using tractors having a small ground clearance and wherein the mounting of the clearance units 30 and 31 beneath the tractor is not possible.

For obtaining large quantities of beet leaves, for example for siloing, larger areas of the field can be lopped only, and without simultaneous clearing of the beets. In this case, lopping devices 44 and clearing devices 45 can be attached laternatively either under the crop carrier 8 or, as shown in FIG. 6, under the tractor. Thus the harvest of beets can be transported immediately to the crop carrier. Larger enterprises could use two crop carriers simultaneously, one carrying the lopping units 44 and the other the clearing units 45.

Figure 9:
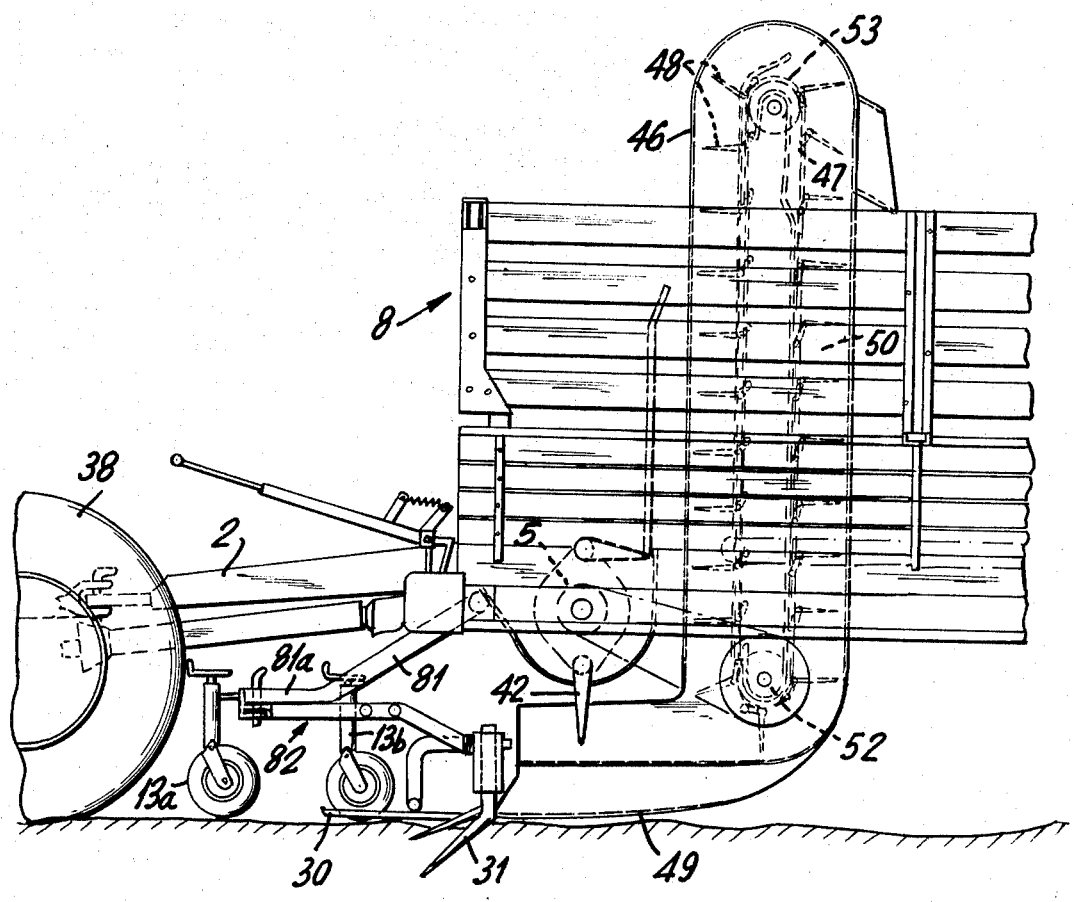
FIG. 9 is a side elevation view.
Figure 10:
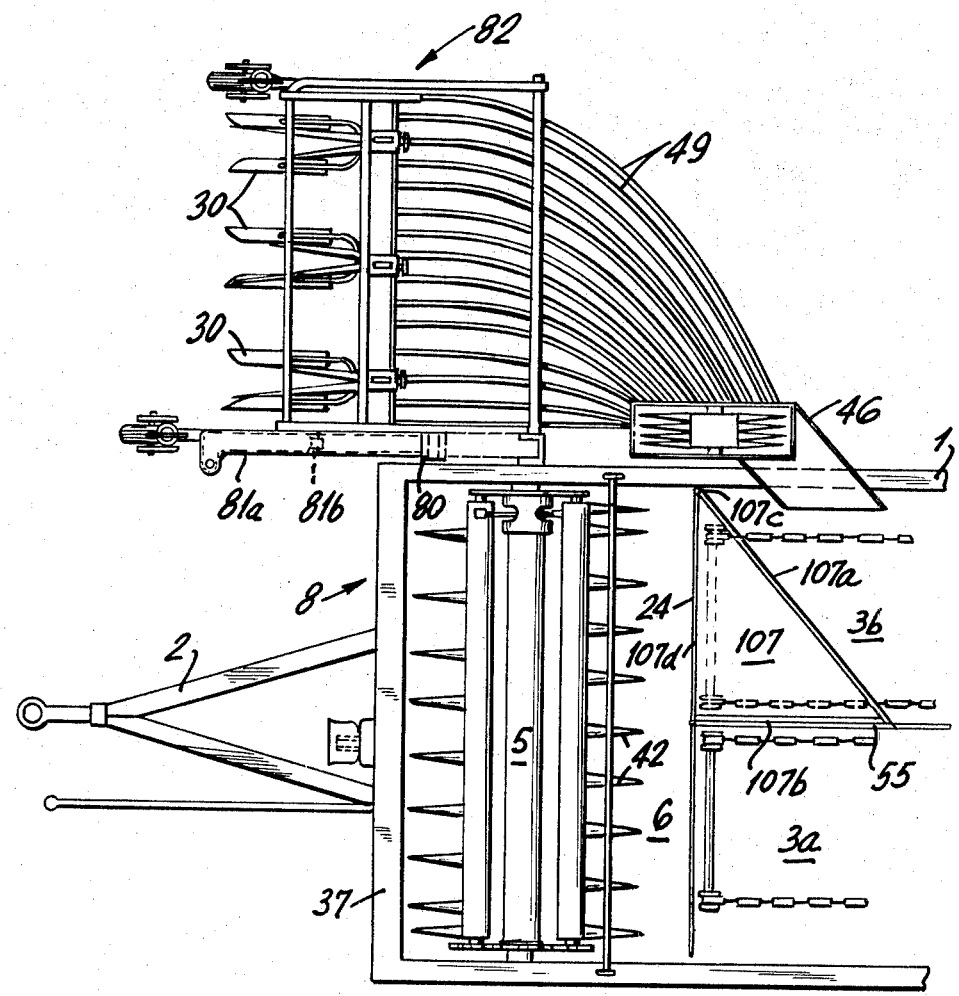
FIG. 10 is a plan view of another embodiment of the invention, similar to that shown in FIGS. 7 and 8.

FIGS. 9 and 10 illustrate another variation of the invention, somewhat similar to FIGS. 7 and 8, and wherein the lopping devices have not been shown for reasons of clarity. Referring to FIGS. 9 and 10, an additional guide or sifting grid 49 is arranged adjacent harvester unit 82, and grid 49 can be designed as a vibrating grid in a known manner. Guide or sifting grid 49 delivers the crop to an elevator 46 suspended laterally on the outside of the frame of crop carrier 8. In a known manner, this elevator conveys the harvested beets, with simultaneous cleaning thereof by shaking or vibrating in a known manner, upwardly and deposits them in the right-hand compartment 3b of the storage portion of crop carrier 8. With the illustrated arrangement, beets and leaves can be conveyed to two different halves, 3a and 3b, of the loading area simultaneously, these halves being separated by a partition wall 55. The upper part of the right wagon box 3b is covered with a preferably oblique guide sheeting 107 in a known manner, since the conveying channel 6, or the operational width of the lopping unit, extends through the entire width of the wagon. Thereby, the merging beet leaves slide up to the middle of the wagon box, or up to the partition wall 55, and are deposited exclusively in the left part 3a of the crop carrier. During their travel, these beet leaves may be vibrated by a simple vibrating device for cleaning purposes.

Guide sheeting 107 has a high, rear vertical edge 107a which is as high as the maximum loading height for beet leaves. It also has a horizontal edge 107b mounted on partition 55, as well as a center part 107 sloping steeply upwardly from partition 55 toward the right-hand side of the crop carrier. The highest portion 107c of this center part 107 joins, together with forward edge 107d, the back wall 24 of channel 6. If, as is illustrated in FIG. 10, the crop carrier is provided with two distributors having separate drives, then it is possible to unload the two cargo halves 3a and 3b successively at any place.

Figure 11:
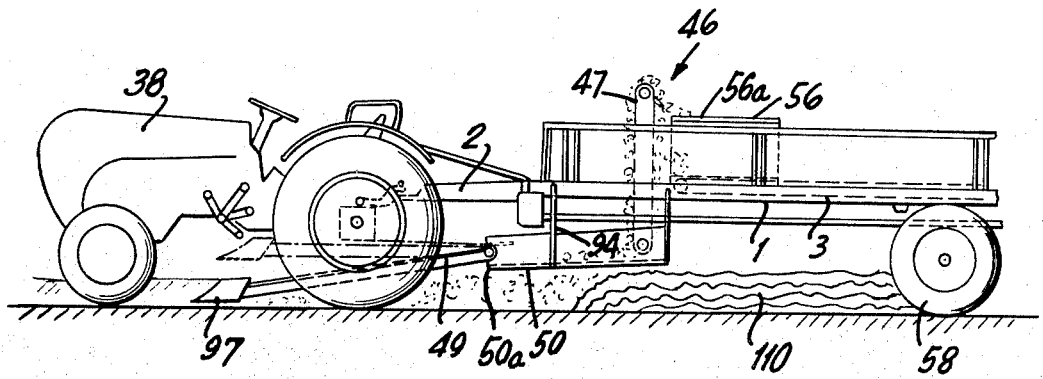
FIG. 11 is a side elevation view.
Figure 12:
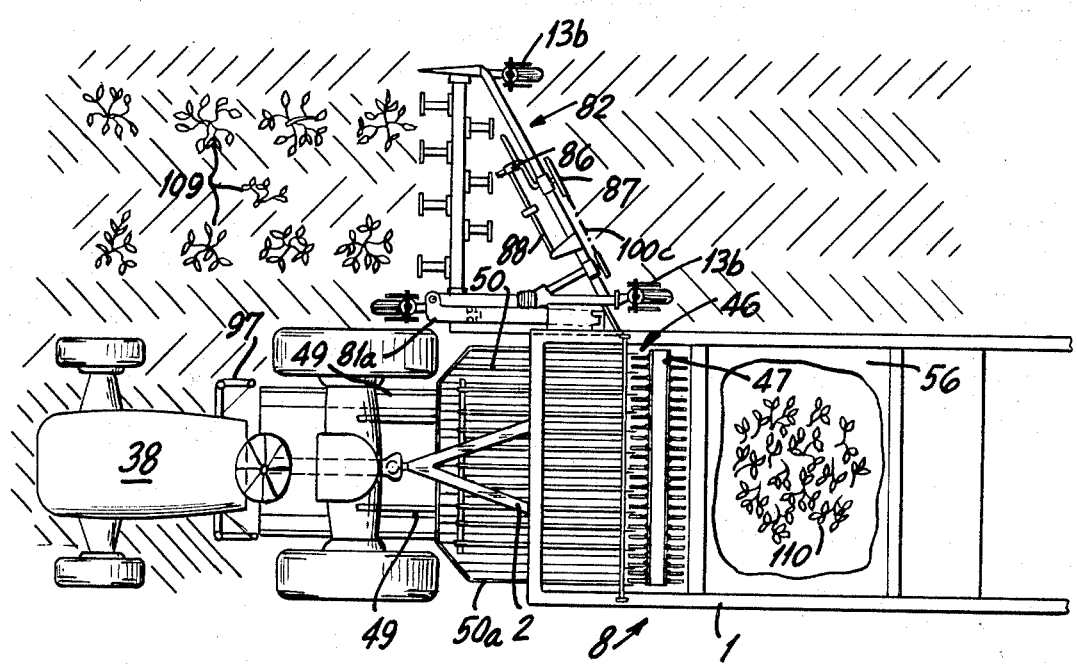
FIG. 12 is a plan view of another form of harvesting device embodying the invention in which plant beater means is provided in the harvesting device and a potato clearing device is provided either on the tractor or on the crop carrier drawn by the tractor.

FIGS. 11 and 12 illustrate a modification of the invention in which it is possible to use crop carrier 8 and harvesting unit 82 to great advantage for fully mechanized harvesting operations for potatoes or other bulb plants. In this arrangement, a known form of clearing blade 97 is mounted beneath tractor 38 and is preferably designed to handle two rows. A known vibrating grid 49, or a known sifting chain, extends rearwardly from blade 97 and receives the crop therefrom, together with the adhering soil. Mechanism 49 conveys the crop between the rear wheels of the tractor and beneath the rear axle thereof, to a point over the front edge 50a of a following, and preferably somewhat broader, filter grating 50 to which the crop is delivered along with some remaining and still adhering soil. Grating 50 is supported by side bars or struts 94 in the forward portion of the crop carrier beneath the space for the loading unit. These struts are adjustable as to height or are liftable. The crop on filter grating 50 is delivered from the rear end thereof into the conveying area of an elevator 46 which may extend through the entire width of the crop carrier. This elevator may comprise known belts having prongs, or chains having conveying scoops or buckets.

Due to the relatively great width of grating 50 or elevator 46, the crop is distributed, during the sifting process, into the flattest possible layer to an extent such that the efficient sifting area is so formed that the conveying speed of the crop can be kept as low as possible over the length of the conveying grid 49 and the conveying grating 50, but without loss in performance. Thereby, the crop is damaged as little as possible. The large operational width of conveyor belt 46 also makes possible very low travel speeds of prongs 47 of the conveyor belt while still attaining a high volume performance.

The loading platform of crop carrier 56 either may be provided with storage boxes 56a of a suitable size and which are successively filled with crops, or may be provided with sorting equipment or sack-filling stands. Depending upon the type of crop, workers can be positioned in the loading wagon to pick out stones, sort potatoes, for example fine potatoes for human consumption, or the like. When the wagon is to be filled with potatoes to be used for fodder, this can be effected without additional manpower other than the tractor operator. The sorting of the crop, in such case, can be effected at the unloading station. The latter procedure is advisable, in any event, if the potatoes are harvested in humid weather so that final sorting is possible only after several weeks of temporary storage.

It is not necessary to use the crop carrier during the first clearing operation if the harvesting conditions are very unfavorable as, in such event, only the tractor, with the attached known sifting grid, is used. Thus, the potatoes are temporarily re-deposited with adhering soil, on the field, so that they are exposed to the sun, for example in the case of humid soil but fine weather. Thereby an accelerated drying can be obtained so that the potatoes can subsequently be selected with the aid of the pickup device 97 and subsequently be cleaned under better working conditions by sifting grid 50 and conveyed by chain 46 to the crop carrier.

When harvesting potatoes whose leaves have not yet decayed, or which are developed to an exceedingly great extent or interspersed with weeds, harvesting unit 82 can be provided with a blade beam or a beet roller 108, as shown in FIG. 12. Unit 82 can be used in any event to cut off the leaves of the next two rows 109 and to deposit them, for example by means of a lateral conveying device 86, behind elevator 46 or below sifting grid 50 in such a manner that they will not impair clearance operations on the next trip. Thereby, any burdening of the sifting device by potato leaves is avoided in the simplest manner and without additional equipment, a clean separation of potatoes is obtained, and the manpower requirements are greatly reduced. Furthermore, it is possible to avoid expensive destruction of potato leaves by chemical means, thus eliminating the danger that these chemical means could lead to an impairment of the biological quality of the potatoes in the event of improper application or unfavorable weather conditions.

With this manner of operation, there is the important advantage, also with respect to potatoes, that, prior to the harvesting of the sensitive crop, only the front wheels of the tractor have to cross the field while the crop has already been harvested when the back wheels of the tractor pass. Thus, the potatoes are harvested without the unavoidable pressure on the ground increasing the dirtying of the potatoes or making cleaning difficult. The roll 110 of potato leaves, deposited under the crop carrier, is indicated in FIG. 12 by a breakthrough in the bottom of the crop carrier. Due to this factor alone, the invention method and apparatus is superior to all known harvesting processes utilizing special machinery. This is quite apart from the fact that the cost of these devices attached to the crop carrier, which is available anyway on account of the harvesting of fodder, amounts only to a fraction of that of known machines for the complete harvesting of potatoes. Furthermore, known components of conventional special machines, such as rolling colters, cleaning devices, vibrating devices, safety slip clutches, protective equipment, and setting and adjusting devices, can be applied analogously, in a known manner, to the potato and beet harvesters. An additional advantage is that a potato harvester such as described, and of sturdy construction, can also be used as a stone collecting machine.

The axle of the crop carrier can be designed, in a known manner, as a driving axle for crop carriers with built-in or laterally attached harvesting devices for hoed vegetables in order to achieve, in the event of operation on several rows, a safe driving and steering of the vehicle across the field, particularly on difficult terrain, and using available medium-sized tractors which, at the same time, avoid detrimental pressure on the ground or detrimental wheel backlash.

When harvesting less sensitive weed or leafy crops, such as straw, low grade hay, etc. which is distributed over the field or, for example, straw which has been deposited as small swaths by a combine, the harvesting unit 82 can be used with advantage in such a manner that it enlarges the effective working width during the pickup process, as a supplement to the collecting drum of the crop carrier. When the swath is traversed by the tractor, or when it is lying in a wide form on the ground, the crop lying in the trail of the tractor can be picked up directly by the pickup drum of the crop carrier. Also, further crop material lying alongside the path of travel of the tractor and the crop carrier can be picked up by the lateral harvesting unit 82 and brought to the area of operation of the pick-up and conveying drum of the crop carrier. Thereby the loading efficiency is increased, fewer paths must be used on the field, the harvesting is accelerated and its cost decreased. For example, if only large areas of straw deposited as swaths by a combine are to be harvested, then it is not necessary to incorporate the pick-up drum 99 and guide plate 85 in the lateral harvesting unit 82. This is true also of special cases, such as long stubbles and long straw. The result is due to the fact that, with a corresponding speed, the conveying elements 86 are easily in a position to rake the mass of straw lying on the ground adjacent the vehicle into the pick-up area of the conveying drum. This manner of operation is useful, above all, in cases where a very clean pickup is not important in any event because, for example, part of the straw is to be plowed under again for manure purposes. Thus, large lots of cut straw can be removed from the crop carrier 8 within a very short time, to an extent such that subsequent processing, for example the turning of furrows, can be effected by making use of the favorable condition of the soil after mowing and threshing. In the above-mentioned cases, the guide tub 91 is removed since it is not needed.

Harvesting unit 82 embodying the invention is usable, in a particularly advantageous manner, for harvesting grain strips or siloed corn even in the case of high plants. The reason is that the long stalks cut by the mowing beam fall obliquely toward the rear. Thus, they are grabbed, in the guide plate 85, and delivered to the tub 91 where they lie almost in a transverse direction so that they can be easily gripped by the conveying elements of the crop carrier. If necessary, they can be conveyed to a cutting device incorporated in the conveying channel of the crop carrier. If plants of this type are cut directly in front of the pickup unit, then a transversely lying feed line for the crop would technically be hardly possible, so that any cutting of the crop would also be substantially impossible.

Enterprises having a relatively small amount of grain cultivation are, with the process and apparatus of the invention, in a position to save the entire cost of a combine for grain harvest. Contrary to harvester threshing operations, grain and straw are cut in one operation as, with less cattle per field, mowing will be done with high stubble in any event. The cut grain and straw are then loaded and carried to the storage area. Thus, a grain harvest can be performed with one tractor, one crop carrier and one operator.

From the foregoing description, it will be apparent that the apparatus of the invention makes possible the use of the crop carrier for additional functions other than the mere loading of stalks and leafy crops. The invention also provides for loss-free and labor-saving harvets, not only of stalks and leafy crops, but also of hoed vegetables in the condition in which the crop is found among the plant stock and without dirtying the crop, without the use of expensive machinery, with increased hourly performance, generally without additional man-power, and usually only requiring the services of the tractor operator. The invention apparatus also makes possible the use of known crop carriers for the improved harvesting methods and without requiring the procurement of new specialized equipment or new types of crop carriers. Consequently, the invention apparatus provides a very considerable saving in work time, man-power and capital investment.

While specific embodiments of the invention have been shown and described to illustrate the application of the principles of the invention, it will be understood that the invention may be embodied otherwise without departing from such principles.

What is claimed is:

1. In tractor-drawn apparatus for harvesting hoed, leafy and stalk crops, the improvement comprising, in combination, a harvesting unit including a frame and a draw bar extending from said frame for towing of said unit along a path laterally adjacent and parallel to the path of travel of a crop carrier having crop pick-up means and drawn by a tractor, with said harvesting unit extending rearwardly and laterally from the tractor; said frame including a first frame member extending parallel to the path of travel of said unit on the side of said frame adjacent to the path of travel of the tractor; said frame including a second frame member extending laterally and forwardly from the rear end of said first frame member; means providing a crop guiding scoop including a bottom wall occupying at least the area defined by said frame members and having a forward crop pick-up edge extending transversely of the direction of travel of said unit, a rear upwardly extending wall extending longitudinally of said second frame member, and a crop discharge edge extending adjacent and parallel to said first frame member; crop conveying means mounted on said frame and having a conveying direction extending substantially parallel to the length of said second frame member and toward said first frame member, for transfer of harvested crop, entering said guiding scoop over said forward edge, laterally and rearwardly of said guiding scoop to the crop discharge edge of the latter; driving means mounted on said first-mentioned frame member; crop distributing means mounted on said frame and operative along the crop discharge edge of said guiding scoop power transmission means connecting said crop distributing means to said driving means and operable to drive said crop distributing means to distribute the crop from said guiding scoop laterally over the load carrying surface of said crop of carrier path of travel of the tractor; coupling means mounted on the side of the crop carrier adjacent said harvesting unit; a means operable to connect said draw bar of said harvesting unit to said coupling means.

2. Apparatus for harvesting, as claimed in claim 1, in which said coupling means comprises a coupling arm pivotally mounted on the side of the crop carrier adjacent the forward end thereof, for swinging in a vertical plane longitudinally of the crop carrier; said coupling arm being swingable between an active position, in which it extends forwardly of the crop carrier, and a retracted position, in which it extends rearwardly of the crop carrier; said connecting means being operable to connect said draw bar of said harvesting unit to said coupling arm in the active position of the latter; the pivot point of said coupling arm and the length of said coupling arm being so selected that the rear edge of said guiding scoop terminates, adjacent said crop carrier, at substantially the rear limit of the operating area of the crop pick-up means on said crop carrier.

3. Apparatus for harvesting, as claimed in claim 2, including crop cutting means on said harvesting unit operable to cut portions of a crop projecting above the ground for pick-up by said guide scoop; and work means on said tractor operable to dig up portions of said crops below ground, and from which the portions above ground have been cut, and to deposit the below ground portions in rows along the path of travel of said crop carrier, the rows being located intermediate the ends of the axle of said crop carrier and having a width substantially less than the distance between the support wheels of said crop carrier.

4. Apparatus for harvesting, as claimed in claim 2, including work means on said harvesting unit operable to dig up crops from below ground level.

5. Apparatus for harvesting, as claimed in claim 4, including an elevator on said crop carrier; said first-mentioned conveying means delivering the dug-up crops laterally and rearwardly to said elevator; and crop cutting means on said crop carrier in advance of the operating area of the conveying means thereon.

6. Apparatus for harvesting, as claimed in claim 5, including a longitudinal partition dividing said crop carrier into two longitudinally extending laterally adjacent compartments; a pair of scraping means, each extending along the bottom of said crop carrier and each located in a respective compartment; the portions of the crop cut above the ground level being deposited on one of said conveying means and the portions of the crop dug from below ground level being deposited on the other of said conveying means.

7. Apparatus for harvesting, as claimed in claim 6, including a metal guide plate covering a forward portion of the compartment of the crop carrier nearest said harvesting unit and sloping obliquely and laterally to deliver cut crops to the other compartment of the crop carrier.

8. Apparatus for harvesting, as claimed in claim 2, including a guide tub mounted on said crop carrier and having a lateral edge extending parallel and adjacent to said first-mentioned frame member; the edge of said guide scoop adjacent said first-mentioned frame member being substantially coincident with said lateral edge of said guide tub; said guide tub having its forward edge elevated relative to the remainder of said guide tub and having a rear edge extending transversely of said crop carrier and in the area of operation of said crop pick-up means on said crop carrier.

9. Apparatus for harvesting, as claimed in claim 8, in which the boundary edges of said guide scoop and said guide tub, when viewed in plan, define a parallelogram shape conveying path extending laterally and rearwardly relative to the forward edge of said guide scoop.

10. Apparatus for harvesting, as claimed in claim 2, which the width of the path cleared during one run, with respect to pick-up of straw, hay, etc., is equal to the sum of the width of said harvesting unit and said pick-up unit on said crop carrier.

11. Apparatus for harvesting, as claimed in claim 1, including support wheels supporting said frame for travel parallel to the path of travel of said tractor; said support wheels be adjustable to adjust the height of said unit above the ground and being removably mounted on said unit.

12. Apparatus for harvesting, as claimed in claim 11, in which said support wheels are at the ends of said second deframe members; said draw bar serving to support the forward end of said first-mentioned frame member on said crop carrier.

13. Apparatus for harvesting, as claimed in claim 1, including a cargo deflector adjustably mounted on said deframe member.

14. Apparatus for harvesting, as claimed in claim 1, including a conveying roller, constituting said destributing means, rotatably mounted on and extending along said first-mentioned frame member; and drive transmission means interconnecting said driving means and said roller to drive the same at different speeds.

15. Apparatus for harvesting, as claimed in claim 14, in which the speed of said conveying means and the speed of said conveying roller are variable and adjustable.

16. Apparatus for harvesting, as claimed in claim 1, including additional crop conveying elements acting in the area of the leading edge of said guide scoop.

17. Apparatus for harvesting, as claimed in claim 16, in which the leading edge of said guide tub extends rearwardly and laterally from adjacent front end of one side of said crop carrier to a point adjacent the area of operation, of said conveying means, on said crop carrier.

18. Apparatus for harvesting, as claimed in claim 1, including a plant beater mounted on said harvesting unit and operable to deposit potato leaves on said guide scoop; a potato clearing unit mounted beneath said tractor to clear potatoes from the ground; and sifting, separating and conveying means receiving the cleared potatoes from said clearing unit.

19. Apparatus for harvesting, as claimed in claim 18, in which said sifting, separating and conveying means are suspended from said crop carrier.

* * * * *